United States Patent [19]

Hazlebeck et al.

[11] Patent Number: 5,405,533
[45] Date of Patent: Apr. 11, 1995

[54] HEAT TRANSFER VIA DENSE GAS IN A FLUID CIRCULATION SYSTEM

[75] Inventors: David A. Hazlebeck, El Cajon; Tihiro Ohkawa, La Jolla, both of Calif.

[73] Assignee: General Atomics, San Diego, Calif.

[21] Appl. No.: 44,277

[22] Filed: Apr. 7, 1993

[51] Int. Cl.$^6$ .................................................. C02F 1/72
[52] U.S. Cl. ........................................ 210/634; 210/761
[58] Field of Search ............... 210/634, 644, 649, 656, 210/511, 761; 165/2, 65

[56] References Cited

U.S. PATENT DOCUMENTS

| | | | |
|---|---|---|---|
| 2,837,180 | 6/1958 | Armstrong | 188/218 |
| 4,222,436 | 9/1980 | Pravda | 165/105 |
| 4,260,336 | 4/1981 | Johnson | 416/96 |
| 4,524,587 | 6/1985 | Kantor | 62/101 |
| 5,132,014 | 7/1982 | Allington et al. | 210/634 |
| 5,133,877 | 7/1992 | Rofer | 210/761 |

OTHER PUBLICATIONS

Brady, et al., "Supercritical Extraction of Toxic Organics from Soils," *Ind. Eng. Chem. Res.* 26:261-268 (1987).
Hahne, E. W., "Natural Convection in the Near Critical Region and Its Application in Heat Pipes," *Natural Convection: Fundamentals and Applications,* Hemisphere Publishing, New York, N.Y. pp. 774-826 (1985).
Paulaitis, M., "Supercritical Fluid Extraction," *Reviews in Chemical Engineering* 1(2):179-250 (1983).

*Primary Examiner*—Frank Spear
*Attorney, Agent, or Firm*—Fitch, Even, Tabin & Flannery

[57] ABSTRACT

A system and method for inducing flow of a dense gas through a fluid circuit without the use of a compressor or other pumping means. A heat absorption chamber has an outlet in fluid communication with the inlet of a heat rejection chamber and has an inlet in fluid communication with an outlet from the heat rejection chamber. Thermal energy absorbed by the dense gas in the heat absorption chamber causes the density of the dense gas to decrease sufficiently to cause the dense gas to flow to the heat rejection chamber. After heat energy is subsequently rejected from the heated dense gas, its density increases, and gravitational or radial acceleration forces acting thereupon induce the cooled, dense gas to flow to the heat absorption chamber displacing the dense gas therewithin. The fluid flow system of the present invention may be used for heat transfer or may be applied to processes such as solvent extraction, reduction of particle size, and oxidation of organic materials employing supercritical water.

9 Claims, 8 Drawing Sheets

HEAT TRANSFER VIA DENSE GAS IN A FLUID CIRCULATION SYSTEM

The present invention relates to systems and methods for effecting heat transfer by inducing the flow of dense gas in a fluid circuit, and more particularly, to inducing a dense gas, such as a supercritical fluid, to flow through a fluid circuit, without pumping or compressing, as a result of the input and withdrawal of heat.

BACKGROUND OF THE INVENTION

The past 20 years has seen the increasing utilization of supercritical fluids in a host of chemical processes, particularly in supercritical fluid extraction. Typically, in supercritical fluid extraction, a dense gas, which serves as solvent or extractant, is brought into contact with the solid or liquid phase of another material (solute) at high pressure and moderate temperature. Slight changes in the temperature or pressure of the solvent gas generally cause large changes in the density of the solvent which can affect the ability of the gas to dissolve the solute. Changes in the temperature or pressure of the extractant can result in the complete precipitation of the solute.

Examples of applications of supercritical fluid extraction include decaffeinating coffee (U.S. Pat. Nos. 3,843,824; 4,246,291; 4,247,570; 4,251,559; 4,255,458; 4,260,639; and 4,276,315), extracting oil from seeds and foods, such as potato chips, fractionating low vapor-pressure oils and fluids, extracting toxic organics from soils, and stripping organics from metal and mineral surfaces.

A pure material becomes a supercritical fluid when its temperature and pressure both equal or exceed the critical temperature, $T_c$, and the critical pressure, $P_c$, of the material. The critical point of a substance is characterized by the temperature $T_c$ and pressure $P_c$ and is a well-defined thermodynamic property where the pure vapor phase of a material has identical properties with a pure liquid phase of the material at the same pressure and temperature, i.e. the gaseous and liquid phases are identical. For example, carbon dioxide has a critical temperature of 87.8° F. (31° C.) and a critical pressure of 1066.3 psia; water has a critical pressure of 3206.2 psia and a critical temperature of 705.4° F. (374.1° C.); and nitrogen has a critical temperature of 227.2° K. and a critical pressure of 492.3 psia. The surface meniscus normally separating liquid and vapor phases vanishes at the critical point; therefore, there is no distinction between liquid and vapor phases at supercritical pressures and temperatures.

Generally, the viscosities of supercritical fluids are intermediate to typical liquid and gas viscosities. Another interesting and useful property of supercritical fluids is that they have solvation power similar to liquids which is directly related to critical fluid density.

Supercritical fluids are typically circulated in systems, such as those mentioned above, by compressors. However, the high pressures at which supercritical fluid systems operate place great demands on compressor components, particularly on the seals, and such seals require frequent replacement. Repair and/or compressor maintenance of supercritical fluid compressors requires depressurization of part of the supercritical fluid system and repressurization before the system can be placed back in service. Furthermore, to eliminate potential contaminants in such systems, the depressurized section is commonly evacuated prior to repressurization. All of the steps associated with the repair and maintenance of supercritical compressors is expensive in terms of labor costs and system down-time, as well as time-consuming. Therefore, it may be appreciated that there is a need for a system or method that is capable of circulating a dense gaseous fluid without the need for a compressor.

Supercritical fluids have also been employed as heat transfer media in heat pipes. A heat pipe is a device that provides a substantial amount of heat transfer through a given surface area. E. Schmidt, a German engineer, demonstrated a heat pipe which provided a heat flux more than 4,000 times greater than the heat transfer rate of a comparably sized copper rod operating between the same temperature limits.

A heat pipe basically includes a condensible gas or vapor and a liquid within a pipe that is sealed at both ends. When the evaporator end of the pipe is subjected to a source of heat energy, the liquid stored in the evaporator end is vaporized, and the vapor moves to the condenser end of the pipe. If the condenser end of the pipe is in thermal contact with a cool environment that absorbs heat energy from the vapor, the vapor condenses and either falls back or is pulled back by capillary action through a wick to the evaporator end. Heat transfer continues as long as the ends of the pipe are subjected to temperatures sufficient to vaporize the fluid at the evaporator end and condense it at the condensing end. Even small temperature differences can be enough to transfer significant amounts of heat energy from end to end of the heat pipe.

However, heat pipes have certain performance limitations which are disadvantageous. Frictional losses attributable to the viscosity of liquid flow through the pipe or the wick restrict the overall practical length of a heat pipe, and heat pipes are generally not suitable for transferring heat energy beyond a distance of about 10 meters. A wick in the evaporator end can be dried out by a high heat flux causing the heat pipe to no longer function. Also, the pipe size should be large enough to prevent capillary forces from interfering with the gas-liquid transport, and as a result, application to small components such as electronics is limited.

Thus, it may be appreciated that there is a need for a heat transfer device which is capable of providing high heat flux, but which is not subject to the performance limitations of a heat pipe. Also, there is a need for a heat transfer system and method that may be employed to transfer heat energy over longer distances than are practical with a heat pipe and/or which can be incorporated into oxidation or extraction processes.

SUMMARY OF THE INVENTION

The present invention provides a system and method for inducing flow of a dense gas through a fluid circuit without pumping or compressing as a result of causing the dense gas to absorb heat energy in one part of the circuit and to reject heat energy in another part of the circuit. A dense gas is defined herein as a gas having a density of about 50 kg/m$^3$ or greater, a definition generally encompassing substances in a supercritical state, i.e., supercritical fluids.

The fluid circuit comprises a heat absorption chamber having an outlet in fluid communication with the inlet of a heat rejection chamber, and an inlet in fluid communication with an outlet of the heat rejection chamber. Thermal energy absorbed by the dense gas in the heat absorption chamber causes the density of the dense gas to decrease so that the dense gas flows to the heat rejection chamber. As a result of heat energy being taken away from the heated dense gas in the rejection chamber, the density of the dense gas increases. Gravitational or centrifugal forces acting on the fluid circuit induce the cooled, dense gas to flow to the heat absorption chamber, displacing the dense gas therein and causing it to flow toward the rejection chamber. By way of example, the fluid flow system of the present invention may be applied to processes such as dense gas extraction, supercritical fluid extraction, reduction of particle size, and heat transfer. The fluid flow system of the present invention may also be employed as a heat exchanger in which dense gas circulates in a fluid circuit as a result of absorbing heat energy at one temperature and rejecting it at a lower temperature.

When operated as a heat exchanger, the fluid circulation system may be employed to deice surfaces of aircraft or ships. For example, handrails on ships may be kept free of ice by incorporating such a fluid circulation system within the handrails. Also, the fluid flow system may be used to prevent excessive accumulation of ice on the superstructures of ships which can make them top heavy and unstable. Other expected applications for the invention include cooling various elements in electronic circuits by transporting the fluid through small channels to increase the heat transfer area.

The present invention may also be characterized as a method for inducing the flow of a dense gas through a fluid circuit, comprising the steps of: heating a dense gas in a heat absorption zone in fluid communication with a heat rejection zone, which zones are located so that a decrease in density of said dense gas will cause a first stream of dense gas to flow from said heat absorption zone to said heat rejection zone; and rejecting heat energy from said dense gas in said heat rejection zone to cool said dense gas, thereby increasing the density of said dense gas and causing a second stream of said cooled dense gas to flow from said heat rejection zone back to said heat absorption zone.

The present invention may further be characterized as a method for oxidizing organic materials. Oxidation is a process involving a chemical reaction with oxygen, e.g. burning and rusting. Oxidation removes electrons from a substance and results in an increase in the positive valence or a decrease in the negative valence of an element or ion. The present method of oxidizing includes the step of supplying an oxidant and organic materials plus a dense gas, e.g. supercritical water, as part of a continuous flow through a reaction chamber so that the oxidant and the organic materials in the mixture react to oxidize the organic materials as a part of an exothermic chemical reaction resulting in a heated dense gas mixture containing oxidation products. The decreased density of the heated dense gas mixture causes it to flow to a heat rejection chamber having a fluid inlet in fluid communication with a fluid outlet of the reaction chamber and having a fluid outlet in fluid communication with a fluid inlet of the reaction chamber. Heat energy is taken away from the dense gas mixture flowing through the heat rejection chamber to cool the dense gas mixture and thereby increase its density. The cooled dense gas mixture then flows back to the reaction chamber displacing the heated gas mixture and creating the continuous flow through the fluid circuit. Oxidation products are appropriately removed from the cooled dense gas mixture, preferably by diverting a side stream therefrom and supplying an equivalent amount of make-up dense gas to the stream entering the reaction chamber.

Because dense gases, including supercritical fluids, have relatively low, gas-like viscosities and no surface tension, and because they undergo large density fluctuations with temperature change, the fluid flow systems and methods of the invention achieve high flow rates with low pressure head loss. An advantage of low pressure head loss is that the thermally induced fluid flow of the system may be made to occur over very long distances, which may easily exceed 100 meters. An advantage of the gas-like surface tension is that the thermally induced fluid flow of the system may be made to occur in very small diameter tubing or channels. Another advantage of a dense gas is that the relatively high density difference between different temperature states of a dense gas allows the dense gas to be circulated in a fluid circuit using heat energy alone as the driving energy source, thereby obviating the need for a compressor or other mechanical pump. Moreover, dense gases have liquid-like solvation power; therefore, a dense gas may be employed as a solvent in the fluid flow system and methods of the invention. These and other advantages of the invention will become more apparent upon review of the specification, drawings, and claims.

DESCRIPTION OF THE DRAWINGS

Throughout the specification and various views of the drawings, like components are referred to with like reference numerals.

DESCRIPTION OF THE PREFERRED EMBODIMENTS

The following description includes the best mode presently contemplated for carrying out the invention. This description is not to be taken in a limiting sense, but it is made for the purpose of describing the general principles of the invention. The scope of the invention should be determined with reference to the claims.

Figure 1:
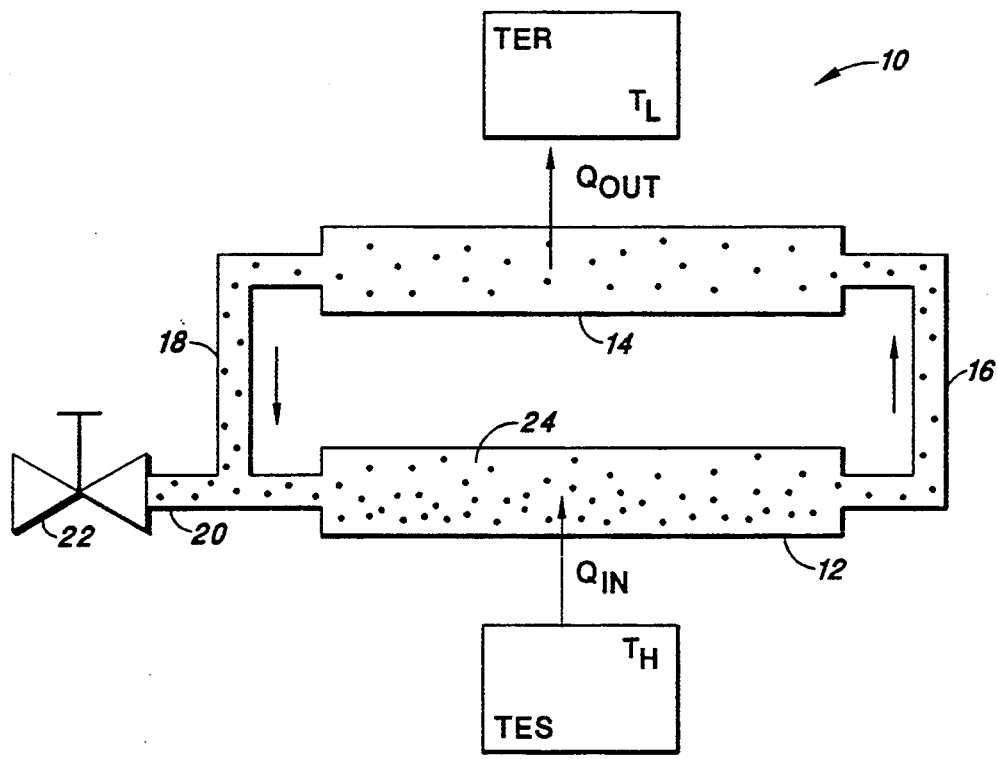
FIG. 1 is a schematic view illustrating an example of a fluid flow system embodying various features of the present invention in which a dense gas circulates in a closed loop fluid circuit as a result of the gas absorbing heat energy from a high temperature environment TES and rejecting the heat energy to a low temperature environment TER.

Referring to FIG. 1, there is shown a fluid flow system 10 in the form of a closed fluid circuit comprising heat absorbing chamber 12 and heat rejecting chamber 14 which are interconnected and in fluid communication with each other at both their ends by ducts 16 and 18. Duct 16 connects the outlet of heat absorption chamber 12 to the inlet of heat rejection chamber 14. Duct 18 connects the outlet of heat rejection chamber 14 to the inlet of heat absorption chamber 12. Tube extension 20 and valve 22 provide access to charge and seal the loop. Fluid flow system 10 is charged with a fluid, most likely in the form of a liquid at a temperature substantially below the temperature limits in which the system is to operate. The mass of fluid introduced into the heat exchanger, which has a fixed volume, is carefully controlled so that by the time that the fluid is heated within the temperature limits between which it is to absorb and reject thermal energy, with a concomitant increase in system pressure, the fluid 24 becomes a dense gas 24.

In the operation of fluid flow system 10, a high temperature thermal energy source, TES, at a temperature $T_H$, provides heat energy $Q_{in}$ which is transferred into heat absorbing chamber 12 and absorbed by dense gas 24 which enters the chamber at pressure P, at a temperature $T_1$ and with a density $\rho_1$, where $T_H > T_1$. The thermal energy source may, for example, include a gas flame, an electrical device dissipating energy in the form of heat, or a relatively warm fluid such as water circulating in a heat exchanger in thermal contact with, e.g. the exterior surface of, the heat absorption chamber. The absorption of heat energy by the dense gas 24 causes the temperature of the dense gas to increase from $T_1$ to $T_2$ and its density to decrease from $\rho_1$ to $\rho_2$. If the fluid flow system 10 is influenced by a gravitational force field, as it would be on earth, and if the highest elevation of the heat rejection chamber 14 is equal to or greater than the lowest elevation of chamber 12, the heated, less dense, but still dense gas, having density $\rho_2$, rises to heat rejection chamber 14 where it rejects heat energy $Q_{out}$ to low temperature thermal energy reservoir TER at temperature $T_L$, where $T_2 > T_L$. The low temperature thermal energy reservoir may, by way of example, include cool liquid flowing through a heat exchanger in thermal contact with the heat rejection chamber, or a gas having a lower temperature (than the temperature at which heat is to be rejected by the dense gas 24) flowing over cooling fins in thermal contact with the heat rejection chamber 14. In the heat rejection chamber, the dense gas 24 becomes more dense as it gives up heat energy until it attains about density $\rho_1$, which corresponds to $T_1$. The pressure preferably remains substantially constant at pressure P throughout the fluid circuit or loop. Gravity pulls the denser, cooled dense gas 24 back down to heat absorption chamber 12, displacing the less dense fluid where the cycle repeats itself. If it is desired to have the fluid flow in a particular direction, for example in the direction of the arrows in FIG. 1, one or both of the chambers 12 and 14 can be slightly angled to the horizontal.

As previously described herein, the dense gas 24 may be, and preferably is, a supercritical fluid. An example of how the mass of fluid may be determined to assure that the dense gas within fluid flow system 10 is in a supercritical state is described below. This example is presented for purposes of illustration only to facilitate understanding of the invention, and it is not to be construed as limiting. Assume that a fluid flow system, such as system 10, has a volume of 5 ft³ and that heat energy is absorbed at about 120° F. and rejected at about 100° F. Further assume that one-half the volume contains $CO_2$ at 100° F. and one-half the volume contains $CO_2$ at 120° F. Since the critical temperature of carbon dioxide is 87.8° F. (about 31° C.) which is below the minimum heat rejection temperature of this example, carbon dioxide may be employed as a suitable dense gas which will transfer heat energy between the desired temperatures at operating pressures which equal or exceed its critical pressure, 1066.3 psia. Carbon dioxide is a substance which is commonly used in supercritical fluid systems because it is non-toxic, non-flammable, inexpensive, and has a low critical temperature of about 304° K. One may select an operating pressure of 1100 psia to assure that the carbon dioxide is always in a supercritical state, even at the lowest design temperature of 100° F. because the critical pressure of carbon dioxide is 1066.3 psia. At this pressure and at 100° F., the specific volume of carbon dioxide is 0.06 ft³/lb$_m$, whereas the specific volume of carbon dioxide at 120° F. and 1100 psia is approximately 0.078 ft³/lb$_m$. Therefore, the required amount of carbon dioxide necessary to achieve a supercritical state at 1100 psia in an evacuated system as set forth in this example is approximately (2.5 ft³×1 lb$_m$/0.06 ft³+2.5 ft³×1 lb$_m$/0.078 ft³).

The difference in specific volumes for carbon dioxide operating between these two temperatures at 1100 psia provides a significant potential energy difference when operating the invention in a gravitational force field that may be advantageously used to promote flow of the carbon dioxide within the fluid flow system 10. Heat transfer to and from the supercritical carbon dioxide provides the energy necessary to drive the system.

Thus, to assure that the fluid which is circulating within such a heat exchanger circulates as a dense gas throughout the fluid flow system, the system should be charged with a sufficient mass of material so that, when the fluid is at the lowest operating temperature of the system, the specific volume is such that the temperature and pressure of the material are sufficiently high that the result is a fluid which is a dense gas. When the dense gas is desired to be in a supercritical state, a sufficient mass of material is introduced into such a fixed volume, fluid flow system so that, at a minimum operating temperature at or above the critical temperature, the pressure is equal to or exceeds the critical pressure of the material.

Although in the example above, carbon dioxide was employed in a supercritical state, it is to be understood that the present invention may employ dense gases comprised of materials other than carbon dioxide, or mixtures of such materials, depending on the requirements of a particular application. Furthermore, such dense gases need not be supercritical fluids.

The pressures at which many materials likely to be employed in the present invention become supercritical fluids are typically on the order of about 70–140 bar (about 1000–2000 psia); however, some like water are considerably higher. Therefore, all of the components of heat exchanger 10 that are subject to the influence of such fluid pressure should be capable of withstanding such a high operating pressure of the fluid. Of course, the specific operating pressure of any such system depends on the particular material being employed as the working fluid.

Figure 2:
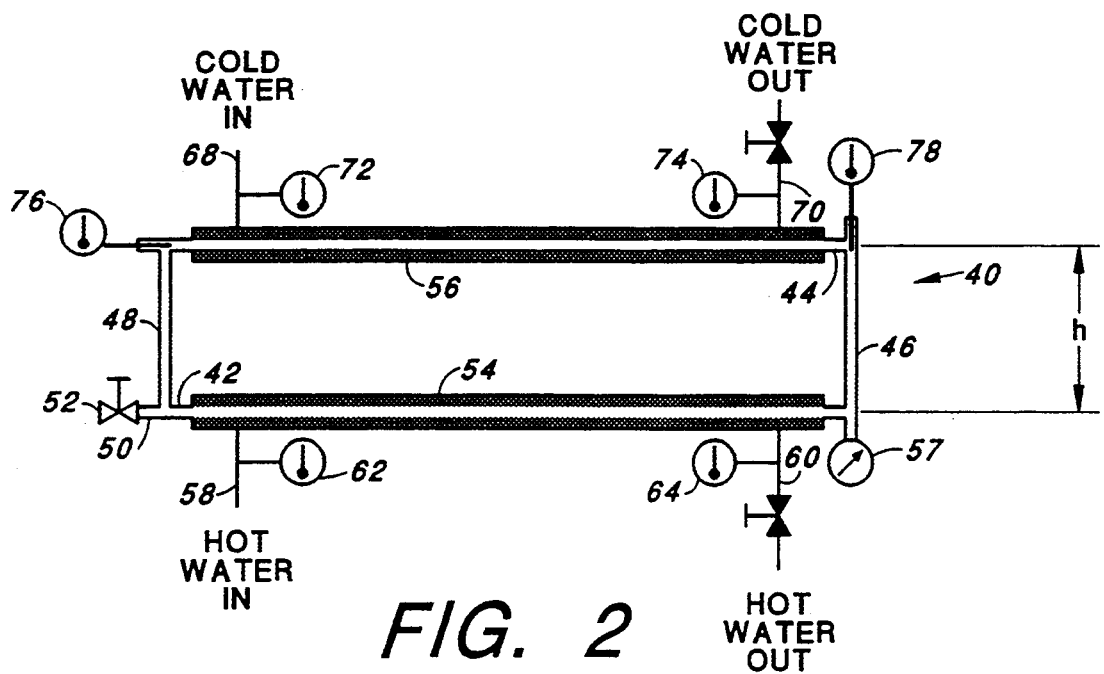
FIG. 2 is a schematic diagram illustrating one example of the fluid flow system of FIG. 1.

The operability of the present invention is verified in an experiment described herein with reference to FIG. 2. Referring now to FIG. 2, there is shown a fluid flow system 40 including a heat absorbing chamber 42 and a heat rejecting chamber 44 which are interconnected and in fluid communication with each other at both their ends by ducts 46 and 48. Chambers 42 and 44 and ducts 46 and 48 are fabricated with $\frac{1}{4}''$ O.D. stainless steel tubing having a 0.035" wall thickness and a 0.18" I.D. Tube extension 50 and valve 52 provide access to charge and seal the loop. Initially, fluid flow system 40 was evacuated. Then, the system was charged with liquid carbon dioxide and allowed to reach thermal equilibrium at the operating temperatures of about 40° C. in the heat rejection chamber 44 and about 65° C. in the heat absorption chamber 42. Carbon dioxide was bled from the system until the system pressure as measured by pressure gauge 57 became about 1445 psia. At those temperatures and this pressure, carbon dioxide is a supercritical fluid.

Heat absorbing chamber 42 and heat rejecting chamber 44 were assembled within $\frac{1}{2}''$ diameter stainless steel tubes 54 and 56, respectively, having ends sealed about the $\frac{1}{4}''$ stainless steel tubing of the heat exchangers 42 and 44, respectively. Heat absorbing chamber 42 and its surrounding tube, or water jacket, 54 are one example of a type of liquid-to-liquid heat exchanger commonly referred to as a double pipe heat exchanger. Heat energy, $Q_{in}$, was supplied to heat exchanger 40 by hot water at 79° C., as measured by thermometer 62; this water entered tube 54 at inlet 58, flowed about chamber 42, and exited the tube via outlet 60 at a temperature of 73.2° C., as measured by thermometer 64. The heat energy, $Q_{in}$, given up by the hot water to the carbon dioxide dense gas was absorbed by the supercritical carbon dioxide within chamber 42 which was heated to 64.9° C. as measured by thermometer 78, at its pressure of about 1445 psia. At this temperature and pressure, carbon dioxide has a density of 269 kg/m³. Cold water enters inlet 68 at 32.6° C., as measured by thermometer 72, and flows through tube 56 around heat rejection chamber 44 where it absorbs heat energy, $Q_{out}$, from the carbon dioxide, causing the cold water to be heated to 36.3° C. by the time it reaches outlet 70, as measured by thermometer 74. As a result of rejecting heat energy to the cold water, the temperature of the carbon dioxide decreases from 64.9° C. to 40.3° C., as measured by thermometer 76. Heat rejection chamber 44 and tube 56 also comprise a double pipe heat exchanger. At 40.3° C. and at a pressure of 1445 psia, the density of carbon dioxide is 630 kg/m³.

The heat rejecting chamber 44 was positioned so that at its lowest elevation it was at a level, distance h (FIG. 2), approximately 50 cm above the highest elevation of heat absorption chamber 42. Although a distance as low as a centimeter or two could be employed for heat transfer in certain microelectronic applications, distances of about 10 cm or greater would be used in extraction or oxidation reactions. As the carbon dioxide cools, it becomes more dense and flows down to heat absorption chamber 42 under the influence of gravity. Conversely, as the cooled dense fluid in heat absorption chamber 42 absorbs heat energy from the hot water flowing through tube 54, the temperature of the carbon dioxide increases and its density diminishes. The less dense supercritical carbon dioxide migrates upwardly to heat rejection chamber 44, resulting in a continuous circulation. If it is desired to assure that the circulation be in a counterclockwise flow as depicted in FIG. 2, the heat rejection chamber 44 could be tilted or angled slightly so that its lefthand end is lower than its righthand end. The tubes 54 and 56, as well as the exterior ports of chambers 42 and 44 and the connectors 46 and 48 were insulated with foam insulation so that there was essentially no heat transfer between system 40 and the atmosphere.

In the above-described experiment, carbon dioxide absorbed and rejected heat energy at the rate of about 498.6 Watts. Since the interior diameter (I.D) of the stainless steel tubing was 0.457 cm (0.18 in), the cross-sectional area of the tubing in a direction normal to the direction of fluid flow, was 0.164 cm². Therefore, the axial heat flux per unit area of the supercritical carbon dioxide was 498.6 W/0.164 cm² or $3.040 \times 10^7$ W/m². The change in enthalpy between the carbon dioxide at 1445 psia and 64.9° C., and at 1445 psia and 40.3° C., is 125 KJ/kg or 125,000 N·m/kg. Therefore, the mass flow rate, m' of carbon dioxide within heat exchanger 40 is equal to: (498.6 N·m/sec)/(125,000 N·m/kg)=0.0040 kg/sec.

The velocity, v, of the carbon dioxide circulating through the heat exchanger may be described as $v=m'/\rho A$, where A represents the cross-sectional area of the heat exchanger (0.164 cm²). Therefore, the velocity of the cooled carbon dioxide is equal to 0.0040 Kg/sec/ [630 Kg/m³·(0.164 cm²×1 m²/10⁴ cm²)], or 0.4 m/sec. Similarly, the velocity of the heated, less dense supercritical carbon dioxide is calculated to be 0.9 m/sec. The difference in densities at the temperatures selected should be at least about 1 kg/m³, preferably at least about 10 kg/m³ and most preferably will be about 50 kg/m³ or higher. The velocity of flow of fluid through those conduits of smallest diameter is preferably maintained at a minimum of at least about 1 cm per second.

It can be seen that the velocities of fluid flow through the described fluid flow system 40 are relatively high. Thus, it can be appreciated that the present invention may be advantageously used as a heat driven pump to circulate a dense gas through a fluid circuit. The capability of the invention to induce flow in a dense gas by the transfer of heat energy alone avoids the necessity of using a mechanical compressor. Compared to mechanically driven fluid pumping or compressor circuits, the present invention provides fewer couplings and rotating seals, thereby reducing opportunities for leakage and mechanical friction losses. The very high heat capacity of a dense gas also allows the present invention to be employed in applications where it is desired to transfer heat energy.

Since a dense gas has a relatively low viscosity, compared to that of a liquid, and no surface tension, the system of the present invention provides fluid flow with low pressure head loss. For example, the viscosity of a typical dense gas, including a supercritical fluid, may be on the order of about $3 \times 10^{-5}$ N-sec/m² (Pascal-sec.), whereas liquids have viscosities of about $10^{-3}$ N-sec/m², and ideal gases have viscosities of about $1 \times 10^{-5}$ N-sec/m².

Figure 3:
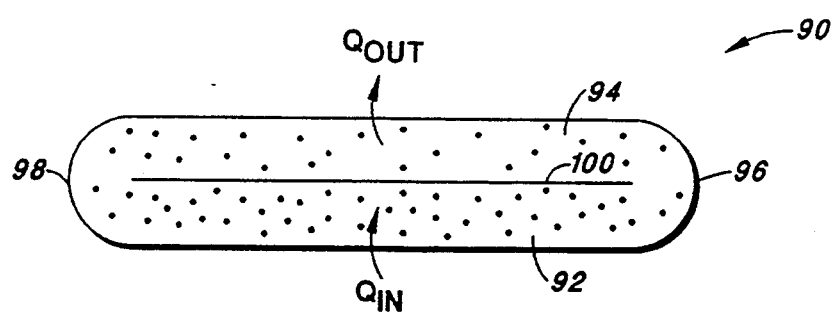
FIG. 3 is a schematic view illustrating a second example of the fluid flow system of FIG. 1.

The present invention may also be configured as shown in FIG. 3. Referring now to FIG. 3, there is shown fluid flow system 90 including heat absorption chamber 92 and heat rejection chamber 94 connected in fluid communication with each other at their ends by elbows 96 and 98. Dividing plate 100 separates the heat absorption from the heat rejection chambers. Heat exchanger 90 is filled through a charge port, not shown, with a sufficient quantity of fluid so that the fluid is a dense gas at the minimum operating temperature of the system. The operating principles of fluid flow system 90 are identical to those of heat exchangers 40 and 10, described above.

Heat energy may be supplied, as $Q_{in}$, to the dense gas from a thermal energy source, TES, such a heat exchanger, gas flame, electric resistance heater, or an electric power-dissipating device in thermal contact with the heat absorption chamber, as would be well known by those skilled in the art. Likewise, heat energy may be rejected from the dense gas as $Q_{out}$ and absorbed by a thermal energy reservoir, TER. Such thermal energy reservoir may include any of a variety of well known heat exchanger configurations in thermal contact with the heat rejection chamber.

Figure 4:
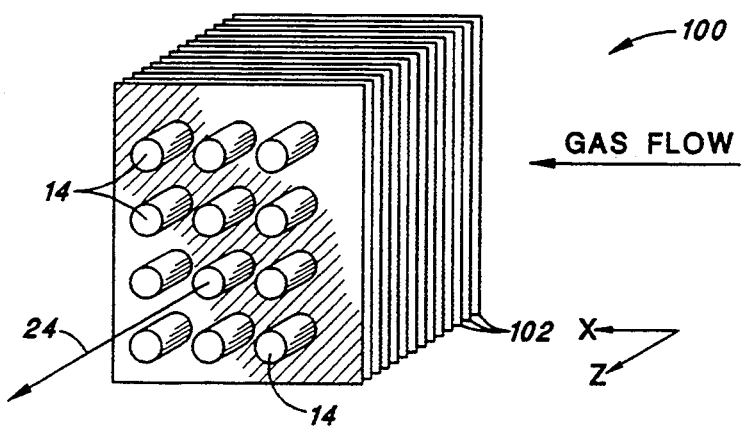
FIG. 4 illustrates an example of a heat exchanger for transferring heat energy away from the dense gas which might be employed as a heat rejection chamber in the fluid flow system of the present invention.

By way of example, as shown in FIG. 4, heat energy may be removed from the dense gas 24 using a heat exchanger 100 that includes multiple fins 102 mounted in thermal contact with one or more heat rejection chambers, or tubes, 14 through which hotter dense gas is flowing. The heat exchanger 100 may be employed in applications where the heat energy, Q, is removed by cold gas flowing over chambers 14 and their attached fins.

Figure 5:
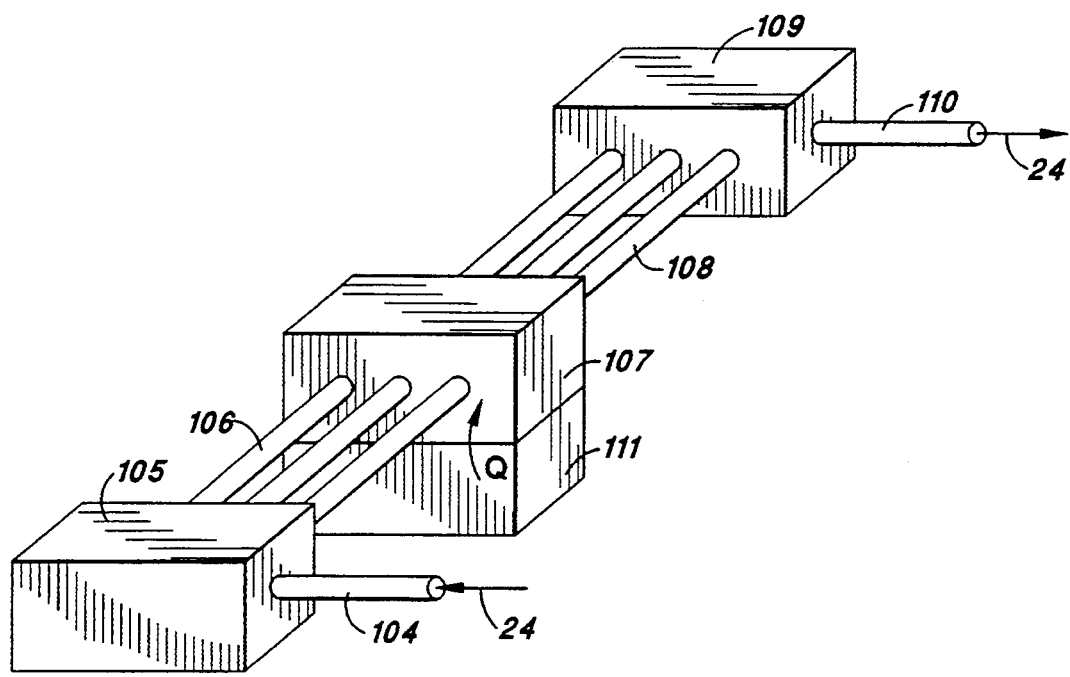
FIG. 5 illustrates a heat exchanger which might be employed to transfer heat energy to the dense gas in the fluid flow system of the present invention.

Another example of a type of a heat exchanger which may be used in conjunction with the fluid flow system 10 to provide heat energy to the fluid 24 is depicted in FIG. 5. The heat exchanger 107 receives heat energy input, Q, transferred by conduction, from a heat energy generating source 111, such as an electronic or other power-dissipating device, which is mounted in thermal contact with the heat exchanger 107. Dense fluid 24 circulating through the heat exchanger absorbs the heat energy, Q, provided by the heat source 111 and carries it away from the heat exchanger, providing sufficient cooling to maintain an electronic device at a desired maximum temperature or below.

More particularly, cooled dense gas 24 flowing through an inlet tube 104 enters an inlet manifold 105 which supplies the dense gas flow to separate tubes 106 which pass through the heat exchanger 107. The dense gas absorbs the heat energy, Q, conducted to the heat exchanger and becomes heated. The separate streams of heated dense gas exit the heat exchanger through exit tube sections 108 and are combined in an exit manifold 109. The dense gas flows out of the manifold 109 through an outlet tube 110. The inlet tube 104 and outlet tube 110 are in fluid communication with a heat rejection chamber, not shown, such as heat rejection chamber 14 of FIG. 1. Heat exchanger 107 may be referred to as a solid to gas heat exchanger.

Although the example presented above in the preceding paragraph describes the solid to gas heat exchanger 107 as absorbing heat energy from a heat source, it is to be understood that the scope of the invention includes applications where such a solid to gas heat exchanger as that depicted in FIG. 5 may be employed to absorb heat energy from the dense gas. In such case, the heat exchanger 107 may serve as a low temperature thermal energy reservoir as a result of its being in thermal contact with a low temperature system, such as a reservoir of cold liquid or gas or some similar heat sink, and accordingly, the warmer, dense gas circulating through the tubes 106 and 108 gives up some of its heat energy and is cooled.

Figure 7:
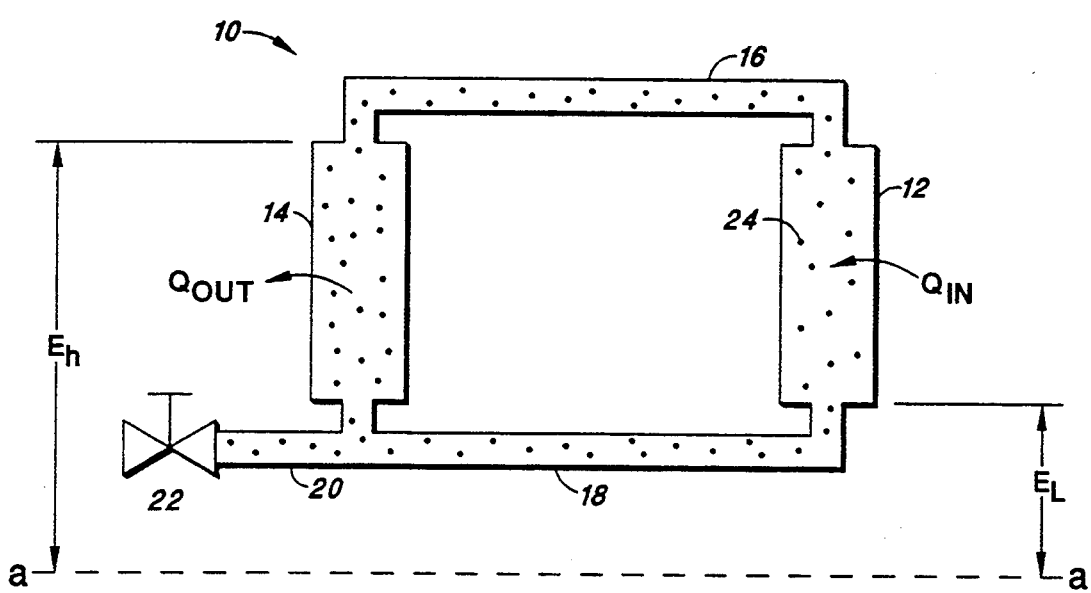
FIG. 7 is a schematic diagram of a fluid flow system embodying various features of the present invention showing the highest elevation of the heat rejection chamber higher than the lowest elevation of the heat absorption chamber.

Typically, a gravitational field acting on the system causes the density differences in the dense gas between its heated and cooled states to result in the flow of the cooled fluid from heat rejection chamber 14 to heat absorption chamber 12 and the upward displacement of the slightly less dense gas therewithin. Gravity efficiently provides this driving force if, with respect to the gravitational field, the highest elevation of the heat rejection chamber is substantially greater than the lowest elevation of the heat absorption chamber. An example of an embodiment of fluid flow system 10 configured in a manner so as to exemplify this condition is depicted in FIG. 7. In FIG. 7, there is shown a fluid flow system 10 which is essentially the same as that described above with reference to FIG. 1 and includes the heat absorption chamber 12 connected to the heat rejection chamber 14 by ducts 16 and 18, as previously described. However, the entirety of heat rejection chamber 14 is not positioned at a greater elevation than the entirety of heat absorption chamber 12, as was shown in FIG. 1. Rather, as shown in FIG. 7, a large percentage of both heat rejection chamber 14 and heat absorption chamber 12 are at a common elevation. In order to assure the efficient flow of cooled, denser gas to the heat absorption chamber 12 when the operation of system 10 relies on gravity, the highest elevation ($E_h$) of heat rejection chamber 14 is substantially greater than the lowest elevation ($E_L$) of heat absorption chamber 12, where $E_h$ and $E_L$ are referenced to an arbitrary datum a—a. The difference between these 2 values, i.e. $\Delta E$, is preferably equal to at least about 1 or 2 cm in most instances for strictly heat transfer operations, and from a practical standpoint $\Delta E$ will usually be at least about 10 centimeters, and most preferably about 50 cm or more when extraction or oxidation processes are involved.

The fluid flow system 10 may also be employed in environments not subject to any gravitational force field, as for example, would be found in outer space, and particularly on satellites orbiting the earth. However, such applications require that there be some restoring force to cause the cooled, more dense fluid to return to the heat absorption chamber. Such restoring force may be provided by rotating the fluid flow system 10 so that radial acceleration forces, produced by such rotation, direct the cooled, dense gas towards the heat absorption chamber to displace less dense heated fluid.

Figure 6:
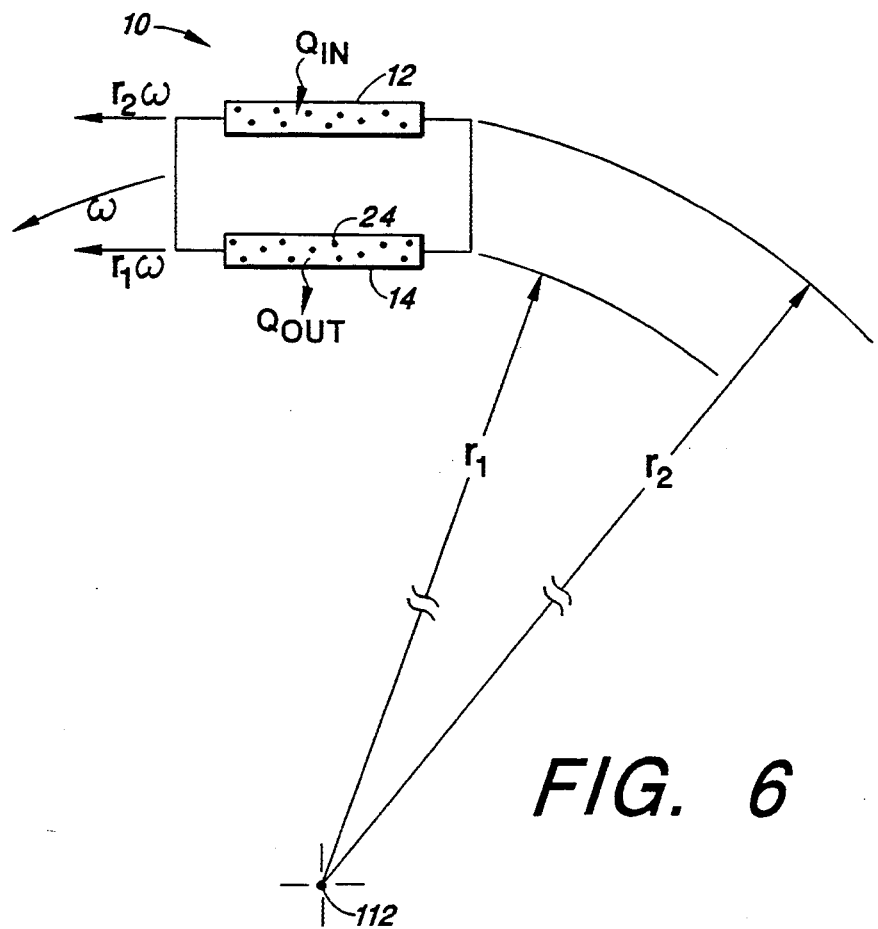
FIG. 6 is a schematic diagram of a fluid flow system embodying various features of the present invention capable of operating independently of gravity.

Referring now to FIG. 6, fluid flow system 10 is shown to rotate in a plane about a center of rotation 112 at a rotational speed $\omega$. The center of mass of fluid in heat rejection chamber 14 is substantially at a radial distance $r_1$ from the center of rotation 112, and the center of mass of dense gas in heat absorption chamber 12 is substantially at a radial distance $r_2$ from the center of rotation. Therefore, the tangential speed of fluid in heat rejection chamber 14 is $\omega r_1$, and the tangential speed of fluid in heat absorption chamber 12 is $\omega r_2$, where $\omega r_1 < \omega r_2$ because $r_1 < r_2$. Rotation of system 10 about center of rotation 112 subjects the denser, cooler gas 24 in heat rejection chamber 14 to a radial acceleration of $\omega^2 r_1$ directed radially away from the center of rotation. The radial acceleration, sometimes also referred to as centrifugal force, provides a force which causes the denser dense gas to migrate outwardly towards heat absorption chamber 12. The migration of the denser dense gas 24 into chamber 12 results in displacement of heated, less dense, dense gas in the heat absorption chamber, causing it to flow towards heat rejection chamber 14.

The fluid flow system 10 may also be used in a gravitational field without regard to the respective elevations of the heat rejection and absorption chambers if the present invention is rotated at a sufficient angular velocity so that the radial acceleration forces acting on the cooled fluid are greater than the force of gravity acting on the fluid, i.e, $r\omega^2 > g$, where g represents the acceleration of gravity.

One application of the principles of the fluid flow system 10 is in the field of solvent extraction. Extraction in general is the process of separating a specific constituent from a mass comprised of multiple constituents. In the process of solvent extraction, a mixture of such a material with other substances is typically placed in a chamber and subjected to treatment with a solvent. The solvent absorbs the material (solute) to be separated, and the solvent and solute flow together as a solution to another chamber where they undergo a temperature change, which alters the solubility of the solute in the solvent so that the solute separates from the solution in a form in which the solute may be recovered.

Figure 8:
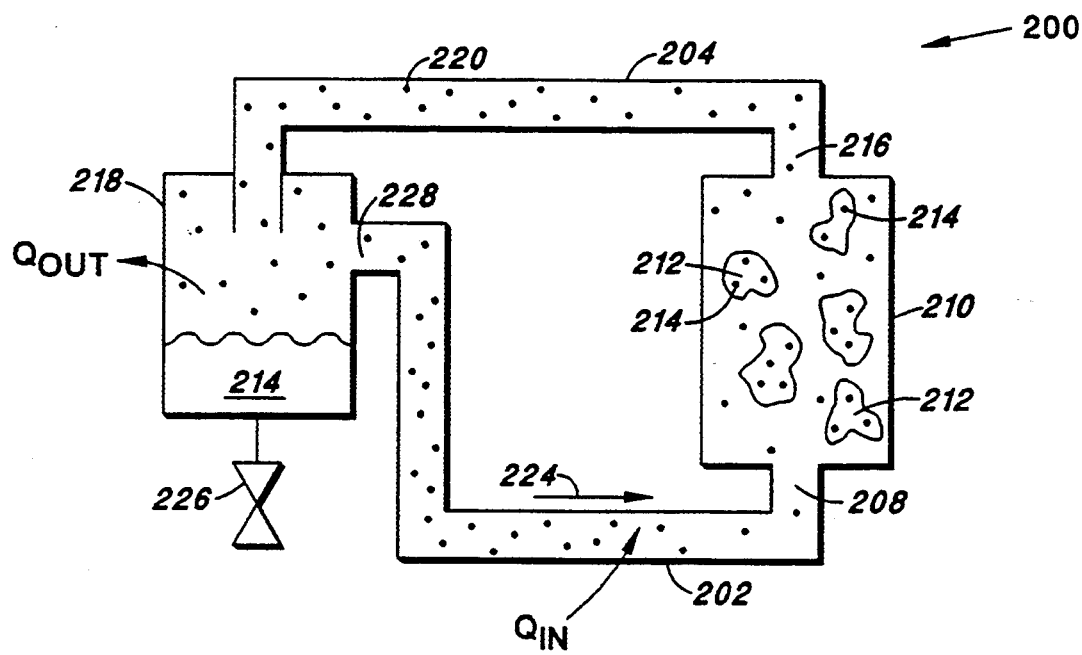
FIG. 8 is a diagram illustrating an embodiment of the present invention adapted to effectuate solvent extraction.

An example of application of the fluid circulating system of the present invention to the process of solvent extraction is described with reference to FIG. 8. In FIG. 8, there is shown a fluid flow system 200 comprising heat absorption chamber 202 wherein heat energy, $Q_{in}$, is adsorbed and heat rejection chamber 218 wherein heat, $Q_{out}$, is rejected. An outlet 208 from heat absorption chamber 202 is connected to a material extraction chamber 210 which holds a solid, porous structure 212 in which is adsorbed a liquid, or solute 214 to be recovered. An outlet 216 from extraction chamber 210 leads to an elongated duct 204 which conveys the heated, dense gas 220 to the heat rejection chamber 218. System 200 is charged with a dense gas 220 which circulates throughout the system 200 in the direction of arrow 224. Heating the dense gas increases the solubility of the solute in this particular dense gas so that the solute 214 carried by the porous structure 212 dissolves in the dense gas to form a dense gas solution, thereby extracting or separating the solute from the porous structure. Subsequent cooling of the dense gas solution in the heat rejection chamber 218 reduces the solubility of solute 214, causing the solute to separate as by precipitation from the dense gas solution.

In the operation of system 200, dense gas 220 is heated in the heat absorption chamber 202, thereby reducing the density of the dense gas. The heated dense gas 220 rises and flows upward through material extraction chamber 210 where the dense gas dissolves liquid material (solute) 214 to form a dense gas solution as the dense gas flows in contact with the surfaces of the porous structure 212. The solution of dense gas 220 and solute 214 exits through duct 204 leading to heat rejection chamber 218 where the solution rejects heat, $Q_{out}$, to a thermal energy reservoir (TER) or the like. Loss of heat by the dense gas solution 220 decreases its temperature and the solubility of solute in the dense gas, causing the solute 214 to separate from the dense gas solution and accumulate at the bottom of the illustrated heat rejection chamber 218. The separated solute 214 then may be collected or recovered through a valve 226. The drop in temperature of the dense gas solution results in an increase in density of the dense gas. The cooled, denser dense gas 220 exits via an outlet 228 from the heat rejection chamber 218 and returns to the heat absorption chamber 202, where it displaces the warmer solution.

A significant advantage of employing the fluid flow system 200 in a solvent extraction process derives from the thermally induced flow of a dense gas, such as supercritical water or carbon dioxide, throughout the system because no compressor is required to induce the fluid flow. The flow of the dense gas throughout the extraction process is driven by the transfer of heat energy to and from the dense gas at different stages of the process and obviates the need for any mechanical pump or compressor.

An example of a specific application of a solvent extraction process is described with reference to separating jojoba oil from jojoba seeds. However, it is to be understood that the invention may be used for many solvent extraction processes other than that described in this example. Furthermore, the present invention may be used for multistage solvent extraction processes employing multiple heat rejection chambers at different temperatures, as would be well known by those having ordinary skill in the art.

At a pressure of about 600 bar (about 8700 psi), jojoba oil has a solubility in carbon dioxide of about 70 g/g $CO_2$ at 80° C., and a solubility of 8 g/g $CO_2$ at 35° C. At this pressure, the density of carbon dioxide is 1033 kg/m$^3$ at 35° C. and 916 kg/m$^3$ at 80° C. Within the range of 916 to 1033 kg/m$^3$ (greater than 50 kg/m$^3$), carbon dioxide is a dense gas. Carbon dioxide heated to a temperature of about 80° C. in heat absorption chamber 202 and then circulated in contact with jojoba seeds placed within extraction chamber 210 will absorb jojoba oil. As the carbon dioxide gives up heat in heat rejection chamber 218, where it is cooled to about 35° C., the solubility of jojoba oil in the carbon dioxide decreases substantially. The jojoba oil separates out of the carbon dioxide and gravitates to the bottom of rejection chamber 218, from which it is recovered through the withdrawal valve 226.

Another example of an application of the system 200, which is also described with reference to FIG. 8, involves the separation of contaminants from soil. For example, soil, which may be contaminated with oil, gasoline, or other toxic substances is placed in extraction chamber 210. Dense gas is caused to circulate and flow past and possibly through the soil particles in chamber 210, dissolving some or all of the soil contaminants. Then, as the dense gas is cooled in heat rejection chamber 218 so that the solubility capacity of the dense gas for these organic contaminants decreases, the contaminants separate from the dense gas. Small samples of soil can be tested for toxic substances by extraction in this manner. Alternatively, soil can be decontaminated, and the contaminants appropriately handled or destroyed.

The system described with reference to FIG. 8 is appropriate for a dense gas having greater solubility for a solute at higher temperatures than at lower ones. However, there are some cases in which the relation between the solubility of the dense gas and the solute is such that the solubility of the solute increases, rather than decreases, with decreasing temperatures. Solvent extraction using such combinations of pressure, solvents and solutes is referred to as retrograde extraction.

Figure 9:
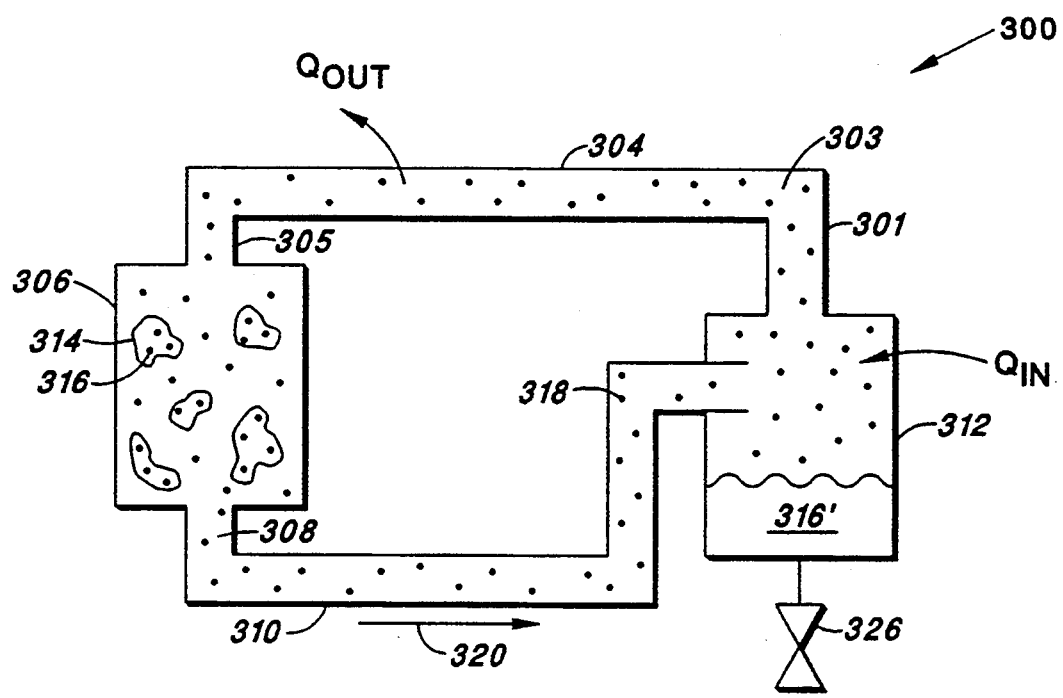
FIG. 9 is a diagram illustrating an embodiment of the present invention adapted to effectuate solvent extraction for a solvent having retrograde solubility with respect to the solute.

Retrograde extraction employing the fluid flow system of the present invention is described with reference to FIG. 9, where there is shown a fluid flow system 300 comprising a heat absorption chamber 312 having an outlet duct 301 in fluid communication with a heat rejection chamber 304. An outlet 305 of the heat rejection chamber 304 is connected in fluid communication to a solute extraction chamber 306 that holds a solid, porous material 314 in which is adsorbed a liquid 316 which is to be extracted as a solute and recovered. The system 300 is charged with a substance 303 that is a dense gas at the operating temperatures and at the pressure of the system and which is capable of dissolving the solute. The solute has significantly different degrees of solubility in the dense gas within the operating temperature range of the system. Heat absorption chamber 312 accumulates solute 316' from dense gas 318 from which it precipitates or otherwise separates as a result of the rise in temperature of the dense gas because the solubility of solute 316 in gas 318 is greater at cooler temperatures than at higher temperatures. Such solubility is referred to as retrograde solubility.

In the operation of system 300, material 314 in which is adsorbed solute 316 is located in solute extraction chamber 306 where it is bathed in the cooled dense gas 303 that is flowing therethrough from heat rejection chamber 304. As the dense gas cools, not only does its density increase, but its solubility for the solute increases. The cooler, denser dense gas solution exits heat rejection chamber 304 and flows downward through solute extraction chamber 306 where the cooled dense gas dissolves solute 316 to form a dense gas solution. The dense gas solution exits the solute extraction chamber 306 through outlet 308, flows through duct 310, and enters at an upper location in the heat absorption chamber 312. In the heat absorption chamber 312, heat energy is provided by suitable means, not shown, to raise the temperature of the dense gas solution. The increased temperature of the dense gas solution results in a decrease in the solubility of solute in the dense gas so that solute 316' precipitates or separates from the dense gas solution and, having a density greater than the density of the dense gas, sinks to the bottom of the chamber 312. The heated, less dense, dense gas rises and flows back into heat rejection chamber 304, thus repeating the process and continuing the circulation. The separated solute 316' may be collected from the chamber 312 through valve 326.

Another application of the fluid flow system of the present invention is in the field of particle size reduction. Particle size reduction in the context of the present invention is effected by dissolving large particles or masses in the dense gas that is being circulated in such a system at one temperature, and then changing the temperature of the dense gas to reduce its solubility so that the dissolved material (solute) precipitates out of the solution in the form of small particles. The size of the precipitated particles may range from tens of microns down to the submicron range.

Figure 10:
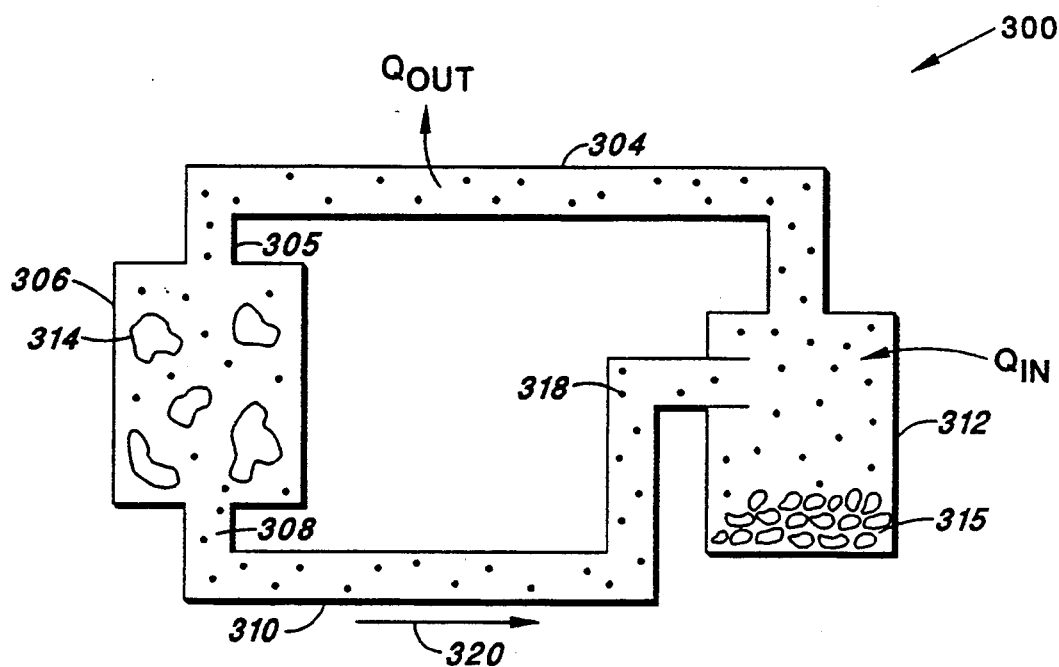
FIG. 10 is a diagram illustrating an embodiment of the present invention adapted to effectuate particle size reduction wherein the dense gas solvent has retrograde solubility with respect to the solute particles.

Referring now to FIG. 10, the system 300 is shown as it could be used for particle size reduction employing retrograde solubility. Bulk materials 314 are positioned in the extraction chamber 306 downstream of the heat rejection chamber 304. As the dense gas 318 rejects heat energy, $Q_{out}$, and is cooled within chamber 304, the solubility of the dense gas for the material comprising the bulk materials 314 increases, whereby the dense gas dissolves some of the bulk material (solute) to create a solution of dense gas and solute. The cooled solution flows through duct 310 and into heat absorption chamber 312 where the temperature of the solution increases as the solution absorbs heat energy, $Q_{in}$. The solubility of solute in the dense gas decreases with increasing temperature, and the solute precipitates out of the heated solution as small particles 315 which fall to the bottom of heat absorbing chamber 312. The heated dense gas 318 migrates upwardly back into heat rejection chamber 304. The minute particles 315 may be removed from chamber 312 either via a batch mode or by a continuous process using means, not shown, as would be well known by those skilled in the art.

By way of example, system 300 may be employed to reduce the size of bulk particles comprised of fused silica ($SiO_2$). Referring to FIG. 10, large particles 314 of fused silica may be placed in particle holding chamber 306. System 300 may be charged with water which is heated to a temperature of about 500° C. in heat absorption chamber 312, and the pressure is adjusted to about 350 bar (5100 psia) to provide a dense gas in the form of supercritical water. The heated supercritical water flows upward into heat rejecting chamber 304 and then to particle holding chamber 306. At 380° C. and 350 bar, water is a dense gas, and the solubility of silica in water is about 1 mg of silica per gram of water (0.10 wt %). The dense gas dissolves the fused silica, creating an aqueous silica solution. The silica solution migrates to heat absorption chamber 312 where the solution is heated to about 500° C. At 500° C. and 350 bar, the solubility of silica in water is negligible. Therefore, silica precipitates out of solution in the form of minute particles 315 that are much smaller than bulk particles 314. The dense gas flows back to heat rejection chamber 304 and the process is repeated.

The particle size reduction process described in the preceding paragraph involves a solvent (the dense gas) in which the solubility of the bulk material 314 is greater at lower temperatures than at higher temperatures; however, such an application is not limited to one utilizing retrograde solubility. The fluid flow system 200 can also be used for particle size reduction, as is described below with reference to FIG. 11 which depicts the fluid circulating system 200 previously described in conjunction with FIG. 8.

Figure 11:
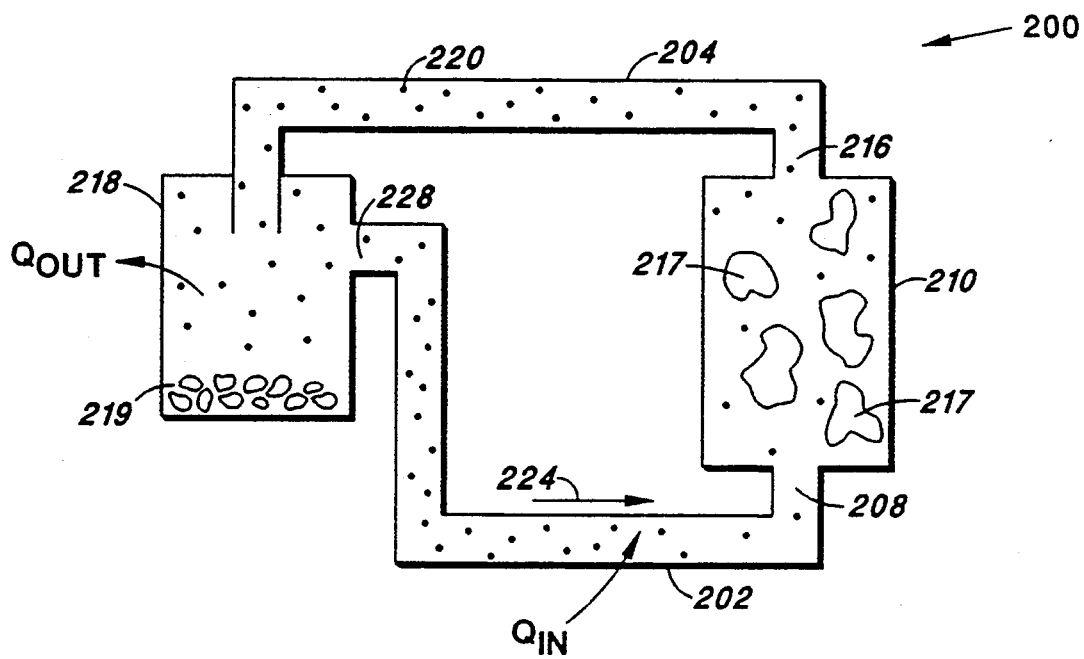
FIG. 11 is a diagram illustrating another embodiment of the present invention adapted to effectuate particle size reduction.

Referring now to FIG. 11, there are shown bulk materials 217 positioned in particle holding chamber 210. Heated dense gas 220 flows in contact with the surfaces of bulk materials 217 and dissolves some of the material 217 to form a dense gas solution. The dense gas solution flows into heat rejection chamber 218 where solute precipitates out of the solution in the form of small particles 219 as the solution cools. The cooled dense gas, depleted of its solute content, flows through heat absorption chamber 202 where it is again heated. The solubility of the particular bulk material 217 in the dense gas 220 increases as the temperature of the dense gas increases. Therefore, the heated, less dense, dense gas rising through chamber 210 dissolves additional bulk material 217, and the process repeats itself. The minute precipitated particles 219 may be removed from chamber 218 in either a batch mode or by a continuous process using means, not shown, as would be well known by those skilled in the art.

The fluid flow system of the present invention may also be employed to oxidize organic chemicals, particularly toxic organics, in a high pressure wet oxidation process. Such a system is shown with reference to FIG. 12, where there is shown a fluid flow system 400 including heat input reaction chamber 402 which receives an oxidant, such as air, oxygen or hydrogen peroxide, through a port 404 and receives organics and make-up water through port 406. Such an inlet stream may comprise about 30–100% by weight organics, with the remainder being water, and the organics are preferably dissolved in water. The water-organic solution dissolves in supercritical water at a pressure of about $3.45 \times 10^4$ kN/m² (5000 psia) operating between temperature limits of about 425° C. and about 650° C. Within this temperature range and at this pressure, water is not only a dense gas but is a true supercritical fluid. Dense gas 418 flows through system 400 in the direction of arrow 410, circulating through reaction chamber 402 and heat rejection chamber 408 one after the other. Duct 412 provides fluid communication between the outlet of reaction chamber 402 and the inlet of heat rejection chamber 408. The outlet of heat rejection chamber 408 is connected to the inlet of reaction chamber 402 through duct 414.

In the operation of a high pressure wet oxidation process described with reference to system 400, the dense gas becomes heated from about 425° C. to about 500° C. or greater in reaction chamber 402 as a result of the oxidation of organics being injected through the port 406 into the dense gas. The oxidized organic chemicals in the dense gas comprise a dense gas mixture, where the term mixture, as used with reference to system 400, includes solutions, emulsions, and suspensions. By way of example, such organics may include, but are not limited to methanol, octanol, dichloromethane, and phenol. The density of the heated dense gas mixture is reduced so the heated mixture rises and flows through duct 412 to enter heat rejection chamber 408. Heat energy, $Q_{out}$, rejected by the dense gas mixture is absorbed by a low temperature reservoir, not shown, at a rate so that, by the time the dense gas exits the heat rejection chamber 408, the temperature of the dense gas 418 is about 425° C. The density of the dense gas decreases as it is cooled, causing the cooled, denser, dense gas to sink through duct 414 and displace heated dense gas in reaction chamber 402 (where the dense gas is absorbing heat energy, $Q_{in}$ generated in reaction chamber 402 by the oxidation of organics). Oxygen and a mixture of water and organic chemicals are injected into reaction chamber 402, and the temperature rises from an entry temperature of about 425° C. to about 500° C. or greater.

The oxidation of the organics in the dense gas 418 creates a dense gas mixture that exits the reaction chamber 402 at a temperature of about 500° C. or greater. As the organic molecules are oxidized, they essentially break down into the products $CO_2$, CO, and $H_2O$. Following cooling of the circulating stream in heat rejection chamber 408, a side stream is withdrawn from system 400 through port 420 in duct 414 to remove these reaction products and prevent the build-up of $CO_2$. Thus, it may be appreciated that the fluid flow system of the present invention may advantageously be employed to transform organic chemicals into innocuous substances.

Figure 12:
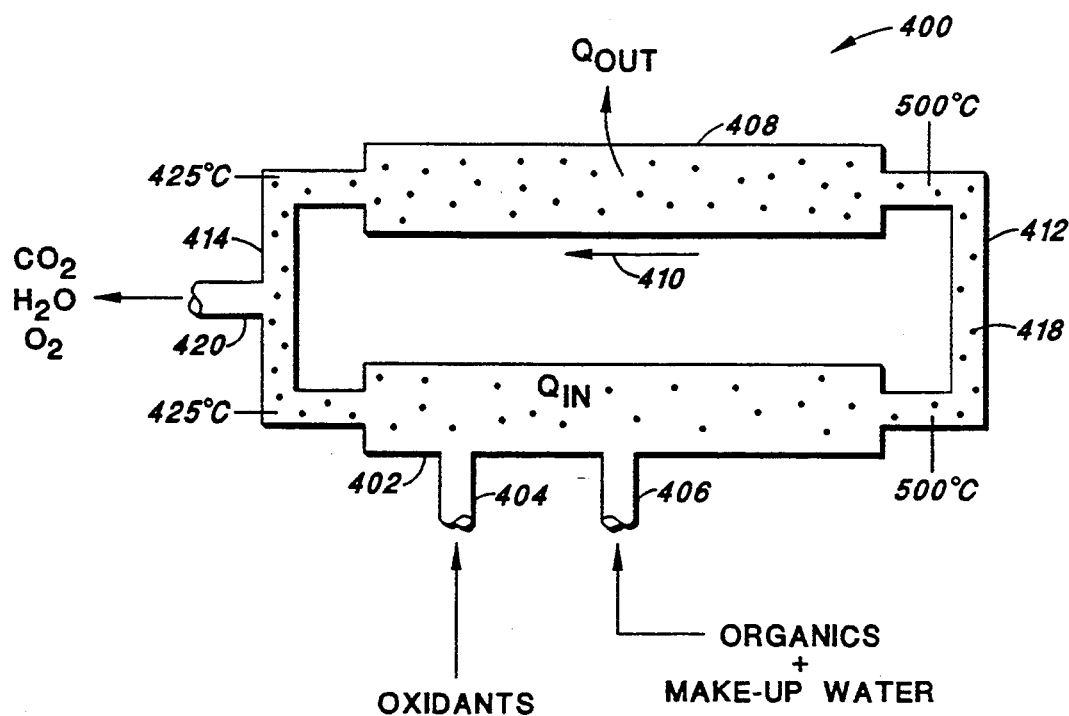
FIG. 12 is a diagram illustrating an embodiment of the present invention adapted to effectuate high pressure, supercritical water, oxidation of organics.
Figure 13:
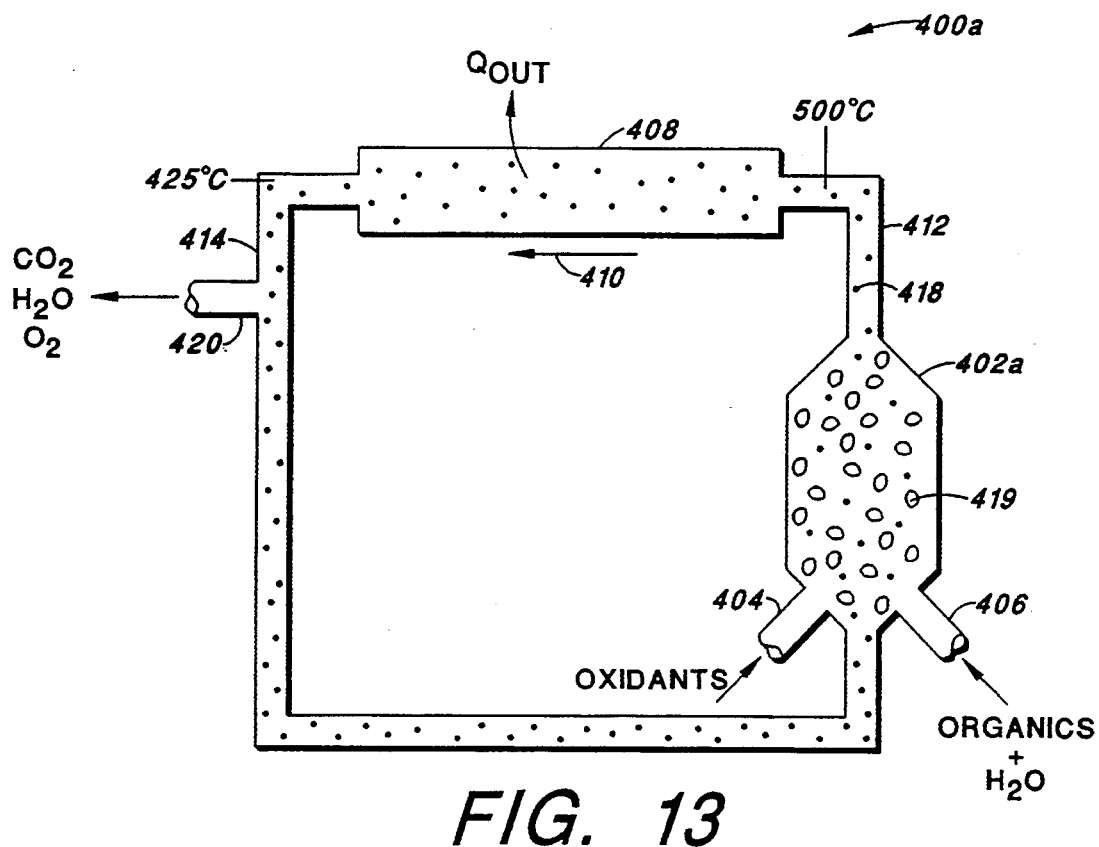
FIG. 13 is a diagram of an oxidation system employing a fluidized bed.

A modified system 400a may employed where the reaction chamber 402 of FIG. 12 is a fluidized bed 402a containing essentially a vertical column of solid particles 419, as shown in FIG. 13. Cooled dense gas from the heat rejection chamber 408 exits via duct 414 which has a fairly long vertical drop and then eventually enters a lower inlet into the fluidized bed 402a and flows upwardly therethrough. The rate of flow is sufficient to fluidize the particles 419, and to achieve such a rate of flow, the difference in height ΔE is preferably at least about 50 cm and more preferably about 2 meters or greater. This promotes the mixing in the reaction chamber 402a of the dense gas 418, oxidants which are provided through inlet 404, and organics and optional water which are provided through inlet 406. Good mixing enhances chemical and thermal equilibrium between the materials within the reaction chamber where the reaction is taking place, and the mixture becomes heated, decreasing its density. The bed of particles 419 preferably includes catalysts, as for example, zirconium oxide or platinum, to promote the oxidation of the organic chemicals, and the presence of the bed of particles enhances thermal stability in this region.

Figure 14:
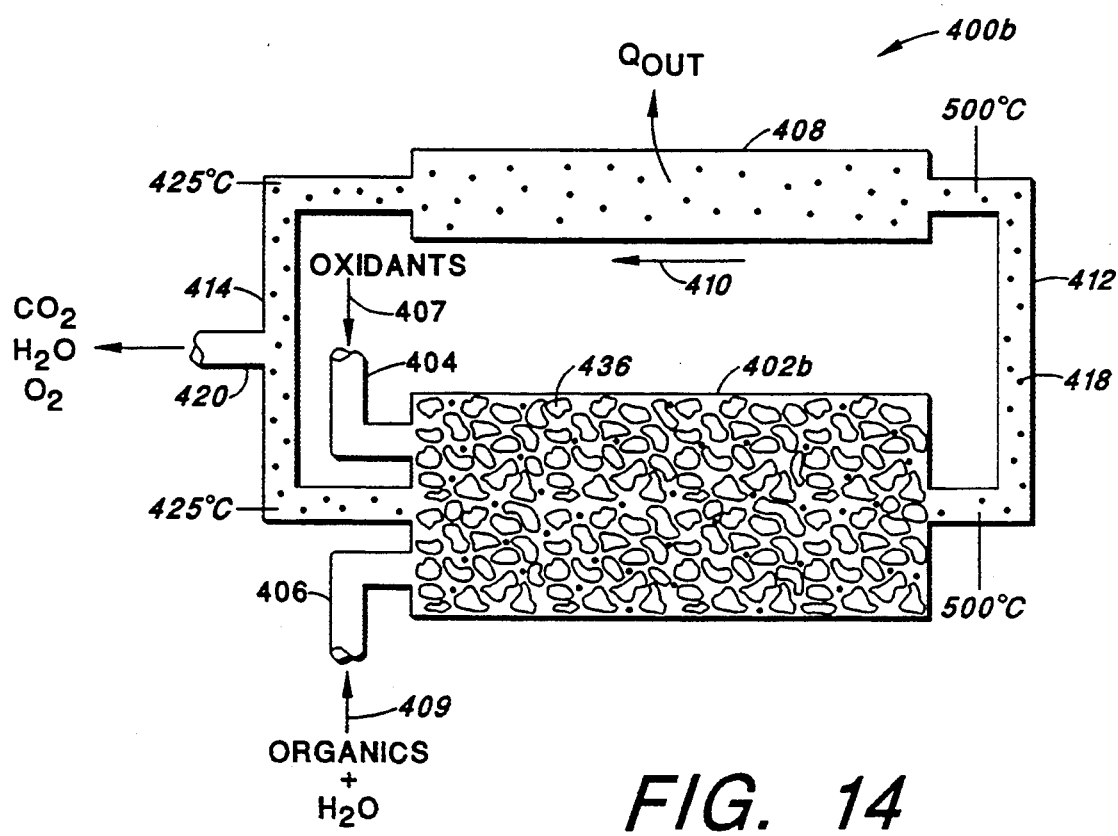
FIG. 14 is a diagram of an oxidation system employing a packed particle bed.

In a further modified system 400b, the reaction chamber 402 is in the form of a horizontally aligned, packed particle bed reaction chamber 402b which contains particles 436, as shown in FIG. 14. The dense gas 418, preferably supercritical water, oxidants 407, and a stream of organic chemicals and make-up water 409 enter the reaction chamber and mix as they flow through the particle bed 436. The particles 436 may be inert materials which simply promote mixing and thermal stability; however, they preferably contain catalytic materials, such as zirconium oxide, to promote the oxidation of the organic chemicals. Particles 436 may also include metal catalysts, such as platinum, deposited upon a substrate having a high surface area. The mixture is heated to about 500° C. in the reaction bed 402b. A side stream is removed through the side outlet 420, and after separation of gaseous products, the water may be recycled.

Figure 15:
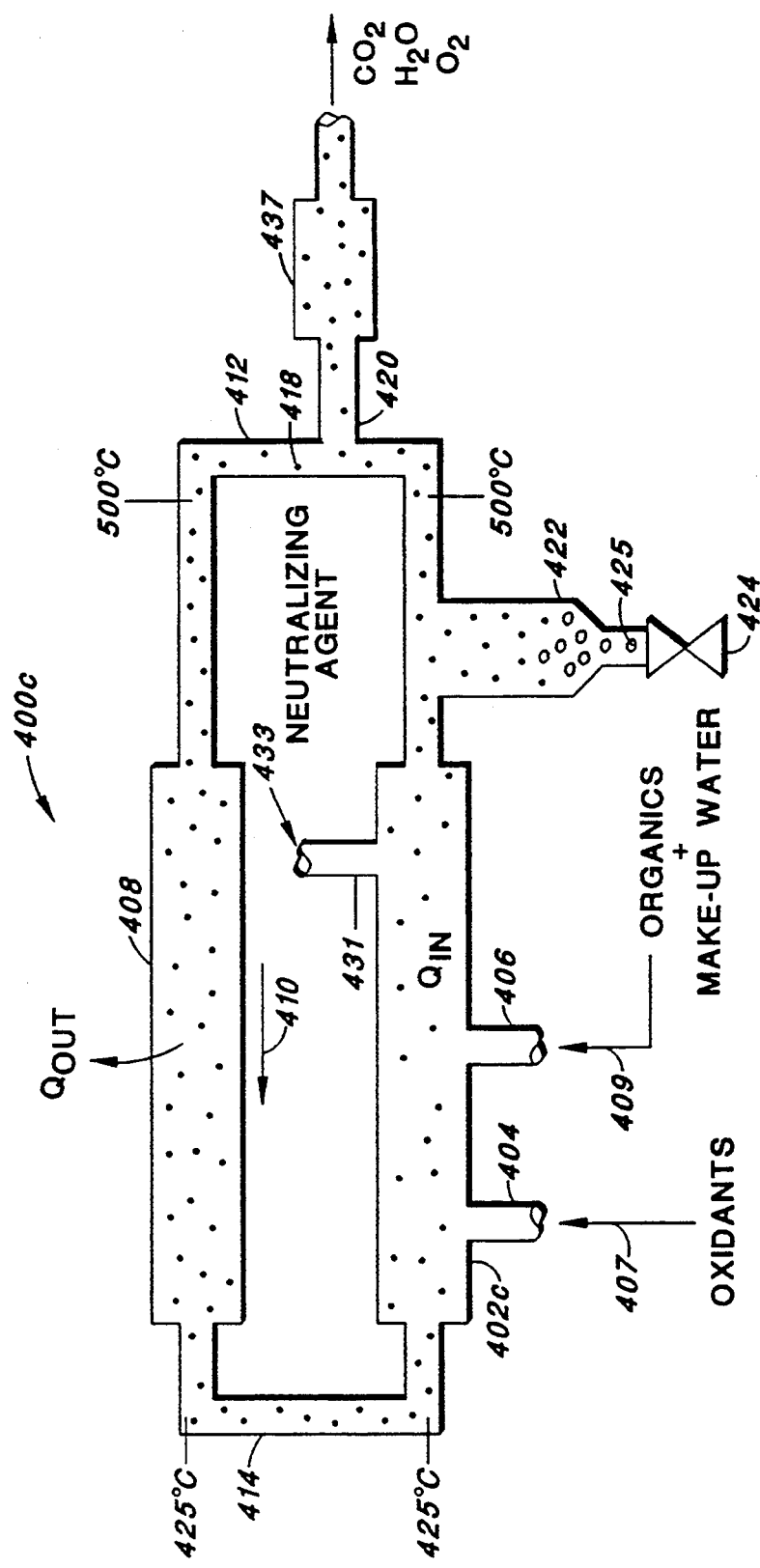
FIG. 15 is a diagram of an oxidation system employing an optional particle separator, the introduction of an optional neutralizing agent, and an optional second reaction chamber.

A still further modification of the general system 400 is illustrated in FIG. 15, where a system 400c further includes a settling chamber 422. The settling chamber is located downstream from the reaction chamber 402c and upstream of the heat rejection chamber 408. By way of example, the settling chamber 422 is shown positioned relatively proximate to the outlet of the reaction chamber 402c. The settling chamber 422 is used to remove solid particulates 425 which may precipitate out of the dense gas mixture following the heat-producing chemical reactions and which could possibly clog the system 400c. Such particulates may be the products of interactions within the mixture of the dense gas 418, oxidants 407, and organic solution 409 and are removed from the settling chamber 422 through valve 424.

Still referring to FIG. 15, the system 400c may optionally include a supply tube 431 for injecting a neutralization agent 433 into the dense gas mixture. The neutralization agent may be injected into the system 400c in any appropriate location, e.g. just downstream from the outlet side of the reaction chamber 402c; however, the agent is preferably injected into the reaction chamber 402c. The neutralization agent 433 is provided to neutralize acids that may be produced from the oxidation reaction of the organic materials injected into the dense gas 418. Examples of suitable neutralization agents include sodium hydroxide and potassium hydroxide. The utilization of a neutralization agent is particularly desirable if the organic material 409 includes elements such as chlorine, fluorine, sulfur, nitrogen, phosphorus, and/or bromine which can create acids such as HF, HCl, $H_2SO_4$, HBr, $HNO_3$ and $H_3PO_4$.

The system 400c may further include a second reaction chamber 437 which is located so as to receive the side stream discharge from port 420 which in this arrangement is located on the inlet side of the heat rejection chamber 408 so the temperature will be higher. The reaction chamber 437 provides an additional opportunity to oxidize any organics which have not yet been oxidized by increasing the residence time during which the organic chemicals are exposed to the oxidants, and if desired a catalyst can be included in the second reaction chamber 437. Following separation of gaseous reaction products and the like, such as $CO_2$, the water from this side stream may be recycled.

Figure 16:
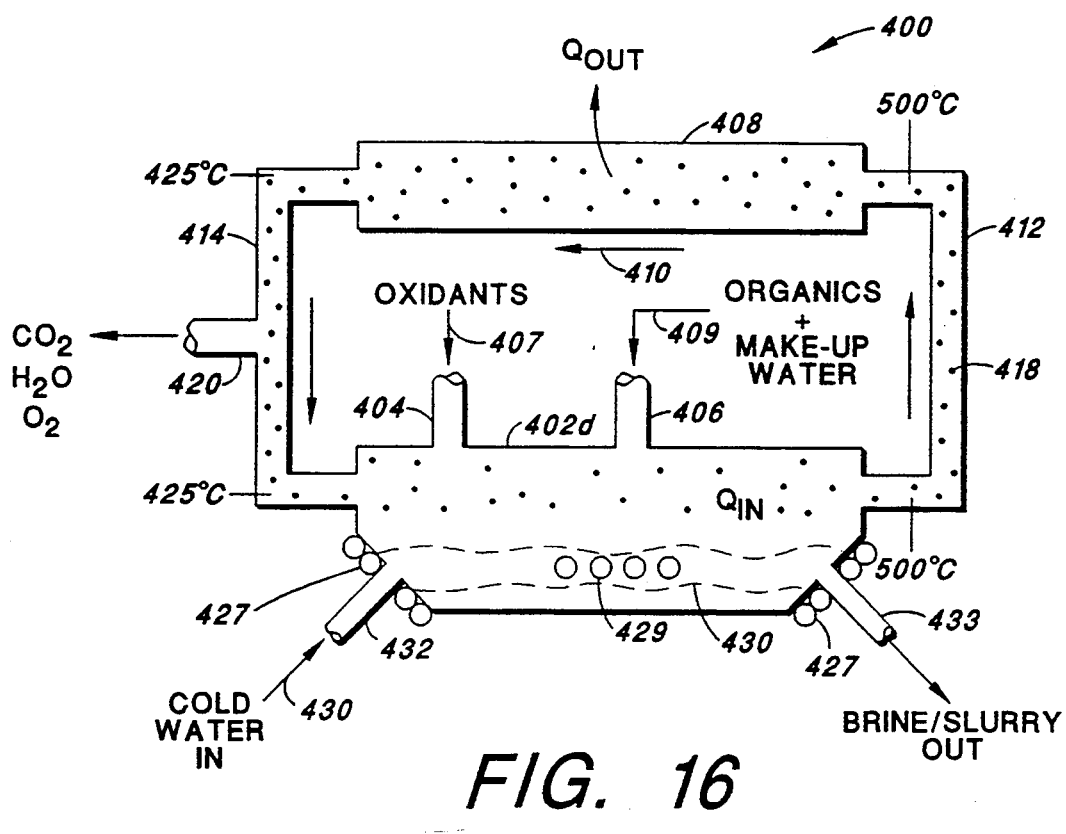
FIG. 16 is a diagram of an oxidation system employing supercritical water and a flushing means for removing salts which may precipitate out of the dense gas mixture circulating through the system.

A reaction chamber may also be constructed to function as an aqueous-phase oxidizer and solids separator. Shown in FIG. 16 is a reactor 402d of the type described in U.S. Pat. No. 4,822,497, the disclosure of which is incorporated herein by reference. The reactor 402d effects oxidation of organic materials using a dense gas, preferably supercritical water. Operation of the single chamber reactor 402d provides two stratified zones, i.e. an oxidation zone in the upper region of the chamber containing dense gas, oxidants and the organics, and a settling zone in the lower region of the chamber containing a stream of purge water 430 which effects a brine or slurry take-off of inorganic solids.

More specifically, dense gas enters the reactor 402d at an inlet at the left hand side and exits the reactor via an outlet at the right hand side. Cold liquid water 430 is pumped through an inlet 432 in the bottom of the reactor, remains in a stratum or layer along the bottom, and exits the reactor through outlet 433. The density of the liquid water is greater than that of the dense gas or supercritical water so the liquid water 430 tends to remain stratified in the bottom of the reactor 402d. The liquid water 430 will dissolve or pick up salts which may precipitate out of the dense gas and sink to the bottom of the reaction chamber 402d, forming a brine and/or slurry. The brine and/or slurry solution is continuously carried out of the reactor 402d through the outlet 433. Salts comprising such a brine are the products of chemical reactions between the oxidants 407 and organics 409 in the supercritical water 418 layer and also of any neutralizing agent that is added.

To retain the desired stratification, the liquid water 430 may be cooled using external cooling coils 427 or internal cooling coils 429 of a type well known by those of ordinary skill in this art.

While the present invention has been described in terms of preferred embodiments, it is to be understood that the invention is not to be limited to the exact form of the apparatus or processes disclosed. Therefore, the invention may be practiced other than as specifically described without departing from the scope of the invention as defined in the appended claims.

Particular features of the invention are emphasized in the claims which follow.

What is claimed:

1. A method for inducing flow in a dense gas without the use of a compressor or other pumping means, which method comprises the steps of heating a dense gas having a density of at least about 50 $kg/m^3$ in a stationary heat absorption zone in fluid communication with a stationary heat rejection zone, which zones are located so that a decrease in density of said dense gas will cause a first stream of dense gas to flow from said heat absorption zone to said heat rejection zone; and rejecting heat energy from said dense gas in said heat rejection zone to cool said dense gas, thereby increasing the density of said dense gas and causing a second stream of said cooled dense gas to flow from said heat rejection zone back to said heat absorption zone, whereby said flow of said dense gas between said zones is accomplished using heat energy alone as the driving energy source.

2. A method according to claim 1 for effecting solvent extraction wherein said dense gas is caused to flow in contact with solid material containing a solute desired to be extracted therefrom so that said dense gas dissolves at least some of said solute to form a dense gas solution having a density less than said second stream of dense gas and wherein said cooling of said dense gas solution in said heat rejection zone causes said solute to separate from said dense gas solution.

3. A method according to claim 1 for effecting extraction based upon retrograde solubility wherein said dense gas is caused to flow in contact with solid material containing a solute desired to be extracted therefrom so that said dense gas dissolves at least some of said solute to form a dense gas solution having a density greater than said first stream of dense gas and wherein said heating of said dense gas solution in said heat absorption zone causes said solute to separate from said dense gas solution.

4. A method according to claim 1 for effecting size reduction of large particles wherein said heated dense gas is caused to flow in contact with large particles of a material soluble in said heated dense gas so that said dense gas dissolves at least some of the material to form a dense gas solution having a density less than said second stream of dense gas and wherein cooling of said dense gas solution in said heat rejection zone causes particles of the material of small size to precipitate out of said cooled dense gas solution.

5. A method according to claim 1 for effecting size reduction of large particles wherein said heated dense gas is caused to flow in contact with large particles of a material soluble in said heated dense gas so that said dense gas dissolves at least some of the material to form a dense gas solution having a density greater than said first stream of dense gas and wherein heating of said dense gas solution in said heat absorption zone causes particles of the material of small size to precipitate out of said heated dense gas solution.

6. A method for oxidizing organic materials, comprising the steps of
continuously supplying an oxidant, organic materials and water to a reaction zone to form a supercritical water mixture therein, wherein oxidation occurs, creating oxidation products and heating said supercritical water so that the density of said supercritical water decreases,
continuously causing said mixture of oxidation products and supercritical water of decreased density to flow as a first stream to a heat rejection zone without the use of a compressor or other pumping means using heat energy alone as the driving force;
continuously rejecting heat energy from said mixture in said heat rejection zone to cool said mixture so that said cooled supercritical water increases in density,
continuously causing said cooled mixture to flow as a second stream back to said reaction zone without the use of a compressor or other pumping means; and
removing at least a portion of said oxidation products from said cooled mixture.

7. A method according to claim 6 wherein said reaction zone in which said oxidizing occurs includes a bed of catalytic particles to promote said oxidation, wherein a neutralizing agent is injected into said reaction zone to neutralize acids that form as a result of said oxidation and wherein particulate matter is separated from said first stream prior to its reaching said heat rejection zone.

8. A method according to claim 6 wherein a portion of said second stream is continuously diverted from its return to said reaction zone to remove said oxidation products and wherein make-up water is continuously supplied to said reaction zone to compensate for the amount of supercritical water diverted.

9. A method for transferring heat between spaced-apart locations by effecting the flow of a dense gas without the use of a compressor or other pumping means, which method comprises the steps of
heating a gas having a density of about 50 kg/m$^3$ or greater in a heat absorption zone in fluid communication with a heat rejection zone as a part of a closed loop, said zones being spatially located in said closed loop so that a decrease in density of said dense gas causes a first stream of less dense gas to flow from said heat absorption zone to said heat rejection zone; and
rejecting heat energy from said less dense gas which flows into said heat rejection zone to cool and thereby increase the density of said dense gas and cause a second stream of cooled more dense gas to flow from said heat rejection zone back to said heat absorption zone in said closed loop.

* * * * *